United States Patent
Janssen

[15] 3,637,181
[45] Jan. 25, 1972

[54] ADHESIVE FIXTURE

[72] Inventor: Edward W. Janssen, Roseville, Minn.
[73] Assignee: Minnesota Mining & Manufacturing Company, St. Paul, Minn.
[22] Filed: Mar. 16, 1970
[21] Appl. No.: 19,768

Related U.S. Application Data

[63] Continuation-in-part of Ser. No. 1,637, Jan. 9, 1970, abandoned.

[52] U.S. Cl. ..........................................248/205 A, 156/320
[51] Int. Cl. ...............................................................A47g 1/20
[58] Field of Search................248/205 A, 467; 156/304, 82, 156/155, 320; 117/122, 62.2, 62.1; 161/DIG. 1, 182, 236, 168

[56] References Cited

UNITED STATES PATENTS

| | | | |
|---|---|---|---|
| 2,549,766 | 4/1951 | Benson | 248/205 A |
| 2,961,363 | 11/1960 | Lowes | 156/304 X |
| 2,679,998 | 6/1954 | Keller | 248/205 A |
| 3,165,283 | 1/1965 | Barisof | 248/467 |

Primary Examiner—J. Franklin Foss
Attorney—Kinney, Alexander, Sell, Steldt & Delahunt

[57] ABSTRACT

A fixture suitable for convenient and rapid attachment to structural surfaces, especially masonry-type surfaces, which has a thermoplastic resin mounting portion which can be softened and pressed against the structural surface and bonded thereto without further means of attachment. The fixture may have a fuel adhered to the mounting portion which upon ignition by a flame will burn to soften the thermoplastic resin to a bonding state.

3 Claims, 5 Drawing Figures

PATENTED JAN 25 1972

INVENTOR.
EDWARD W. JANSSEN
BY Kinney, Alexander,
Sell, Steldt & De La Hunt
ATTORNEYS

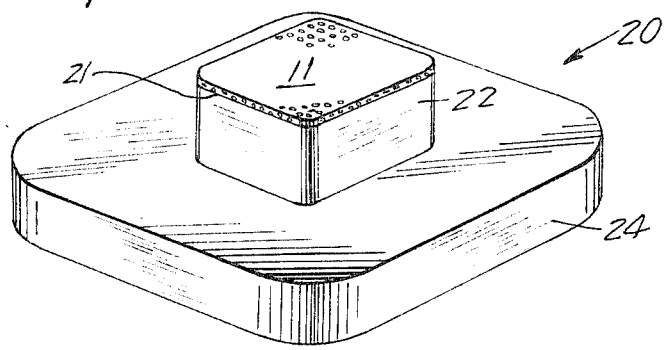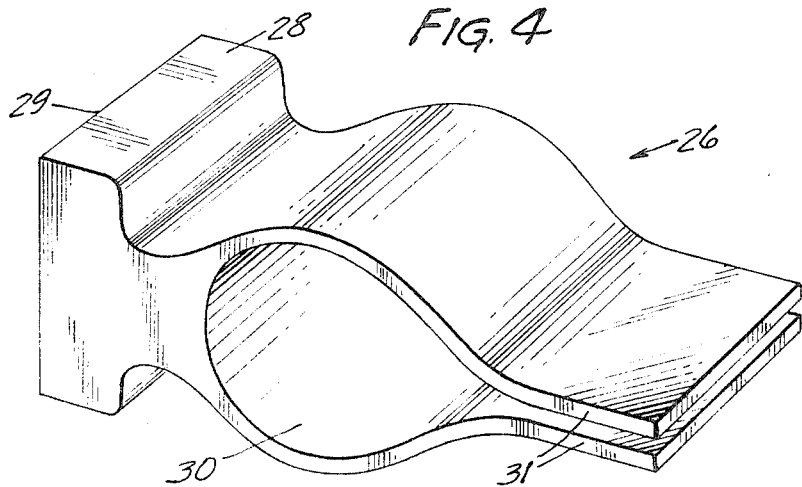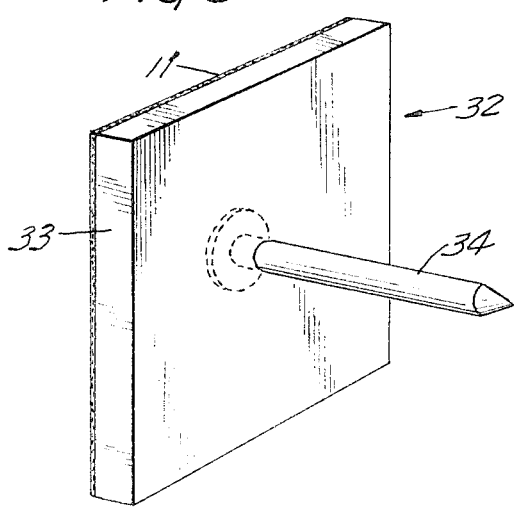

ADHESIVE FIXTURE

This is a continuation in part of my application, Ser. No. 1,637, filed Jan. 9, 1970 now abandoned.

This invention relates to articles in the form of wall fixtures, brackets, and the like, and in particular to such articles having an integral mounting portion of a thermoplastic resin capable of strong bonding to various types of wall constructions, especially cement, concrete, and the like.

Wall fixtures or brackets are found in many shapes and sizes depending on the particular task they are designed to perform. Thus, there are coat hangers, picture hangers, and wall brackets for mounting or supporting a variety of objects, e.g., electrical boxes, electrical conduits, fire extinguishers, pipes, etc. Such conventional fixtures are generally of a wooden or metal construction although other materials such as thermosetting plastics have been employed. Particularly where the bracket or other fixture must withstand forces of more than a few pounds per inch, mounting of the fixture or bracket is accomplished by screws, nails and the like which extend through the fixture and into the primary structural member, such as a wall. In the case where such structural member is a friable material, such as concrete, cement, stone, ceramic, or other masonry material, it is first necessary to drill a hole into which an anchor, usually lead, is inserted, followed by placement of the nail, screw, or bolt into the anchor. This is an expensive and time-consuming operation, for example, whereas 5 to 10 minutes is required for drilling holes and inserting lead anchors, bonding of the articles of this invention can be accomplished readily in 20 to 30 seconds. Moreover, due to the friable nature of the structural member, which is generally weakened even further in the surrounding area by the drilling of the anchor hole, the strength and permanency of the attachment of the fixture may be relatively poor. Because of this weakening of the surrounding area, there is also a limit to the number of holes which can be drilled in a given space. Also, the anchor piece imposes limitations upon this mode of attachment since it loses its retentive capabilities after one or more than a few instances of screw or bolt replacement. Finally, this mode of attachment defaces the structural member to the extent that it must be rebuilt in the attachment area, and in most cases, the rebuilt area is physically weaker and fails to match the remaining portions of the structural member. Avoiding drilling and defacement is especially important when decorative ceramic tile is involved, e.g., interior bathroom surfaces.

It is one object of the present invention to provide a fixture which is internally strong and capable of being firmly bonded to structural members of a friable construction.

Another object is such a fixture which can be readily affixed to the structural member.

Still another object is such a fixture which can be affixed without weakening the structural member.

Another object is to provide a fixture which can be affixed to a structural member without drilling into the structural member.

These and other objects are accomplished in the present invention which in one embodiment comprises an article or fixture having at least one mounting portion adapted for attachment to a structural surface and at least one working portion, at least said mounting portion comprising a thermoplastic resin capable of strong bonding to friable structural materials, said resin having a melting point of at least about 150° F., and a yield strength of at least about 1,000 p.s.i. at 20° C.

Although the mounting portion of the fixture is generally one face of the fixture and is flat in shape, as is dictated by its principal function, which is attachment to flat surfaces, the mounting face may have ribs or ridges formed thereon if desired. While the fixture is primarily adapted for attachment to masonry surfaces such as cement, concrete or other friable materials, other surfaces are contemplated, including plastics, metals, and wood.

The working portion may be constructed of the same or a different material as the mounting portion. Thus, the working portion may be a thermoplastic resin of the type suitable as the mounting portion, a different resin, either thermoplastic or thermosetting, or metal, wood, glass, etc. It is preferred that the working portion be constructed of a material or treated in such a manner that it will firmly bond to the thermoplastic resin of which the mounting portion is comprised. In the preferred embodiment, the mounting and working portions are of a unit construction of the same material.

The shape of the working portion may vary depending upon the function to be performed. For example, if a coat hanger or the like be desired, the working portion includes an appendage with an upwardly extending terminal portion which grasps the collar or loop therein. If the fixture is to serve as a bracket for mounting a fuse box or a fire extinguisher or similarly shaped article, the working portion and the mounting portion both may be flat, opposing faces of a sheet.

In another embodiment of this invention, there is provided a fixture as above defined wherein the face of the mounting portion bears an adhered coating of a fuel capable of igniting and burning for a time and at a temperature sufficient to melt said thermoplastic resin of said mounting portion adjacent said coating of said fuel.

In other embodiments, this invention relates to methods for applying fixtures of the foregoing description. Thus, the mounting portion of the fixture is heated for a time and at a temperature sufficient to melt an area of said mounting portion sufficient to provide the desired bonding area, and this area, while in the melted condition, is pressed against the structural member for a time and pressure sufficient to provide intimate contact between the fixture and the structural member in the bonded area. Upon allowing the melted area of the mounting portion to cool below the melting point, the bond is set. Removal of the fixture can be accomplished of course by the exertion of a force greater than the bond strength; generally, it is desirable to heat the bonded area to achieve a concomitant weakening of the bond. Removing the fixture with the bonded area may require exertion of a force which will cause a failure in the structural member rather than the fixture-structural member interface, especially where the structural member has a porous, pebbly surface allowing for some penetration of the mounting portion into the structural member. Such structural member failure high lights the strength of the bond, yet in practice it has been found that such structural member failure causes only slight defacement and no significant weakening of the structural member in contrast to the effects of drilling as above discussed.

To better understand the invention reference is made to the accompanying drawings, wherein:

FIG. 3 is a perspective view of yet another fixture of this invention;

FIG. 4 is a perspective view of still another fixture of this invention; and

FIG. 5 is a perspective view of a further fixture of this invention.

Figure 1:
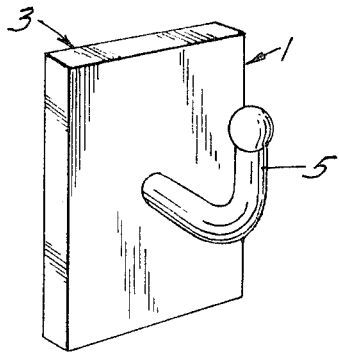
FIG. 1 is a perspective view of one fixture of this invention.

Referring first to FIG. 1, the fixture 1, in the shape of a coathanger, has a mounting portion 3 and a working portion 5. In this illustration the coathanger is of a unit construction, although it is not necessary for this to be so.

Figure 2:
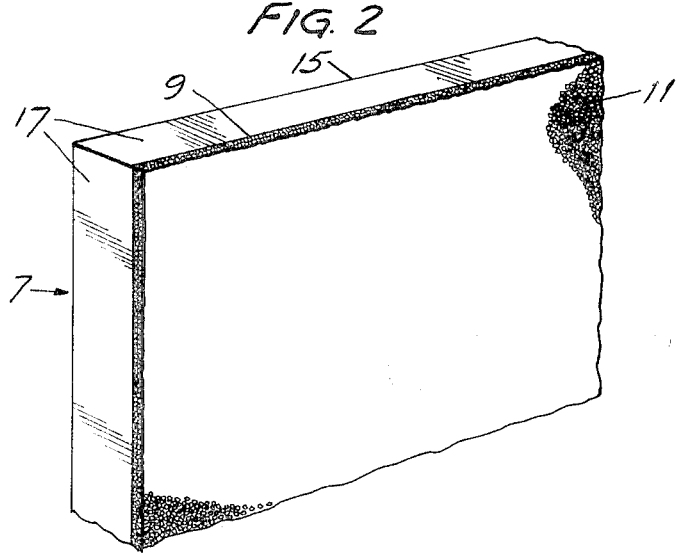
FIG. 2 is a perspective view of another fixture of this invention.

Referring to FIG. 2, the fixture 7 is a rectangular block having a face 9 which constitutes the mounting portion. Adhered to face 9 is a coating of a powdered fuel 11. In this embodiment, the working portion 13 includes the face 15 as well as the interior 17. In this embodiment, the fixture serves as a bracket, the working portion 13 serving as the situs for screws, bolts, nails, or the like which are employed to mount the desired article to the primary structural member; e.g., vertical wall. Because of the excellent bond strengths achieved at the mounting portion—structural member interface, the nails, bolts, screws or the like need only penetrate the fixture which, due to its nonfriable nature, is not deleteriously affected by drilling as are concrete, cement, or other masonry-type construction materials.

In FIG. 3 there is shown a support member, or fixture, 20 which has a mounting portion 22 and a working portion 24. A coating of a powdered fuel 11 may be adhered to the face 21 of the mounting portion, as shown, if desired. The support member, or fixture, shown is of a unit construction but it is not necessary for this to be so. This type of fixture is particularly useful for mounting junction boxes or conduits thereon. The face of the mounting portion is heated, either with an external heat source or by igniting the fuel coating which may be provided on the face of the mounting portion, to such an extent that said face becomes soft and sticky, whereby said face can be pushed against, and made to adhere to, a wall or other suitable mounting surface. The working portion can then be used to mount suitable fasteners thereon, e.g., with screws or bolts. After putting a simple cover over the fixture, the entire fixture then conveniently serves as a junction box or conduit.

In FIG. 4 there is shown a bracket or support member, 26 for mounting or supporting pipes, cables, tubing, or the like. In this illustration there is included a mounting portion 28 and a working portion 30. The mounting portion face 29 may be coated with a powdered fuel, as shown in FIGS. 2 and 3, if desired. The working portion includes resilient members 31 which are capable of being sprung away from each other so that the working portion may receive a pipe, tubing, cable, or the like. The members 31 may then be fastened together at their ends, if desired, by bolts or screws, or by heating the ends until soft and bringing them in contact with each other. Although the bracket, or support member, shown is of a unit construction, it is not necessary for this to be so.

In FIG. 5 there is shown a fixture 32 which has a mounting portion 33 and a nail 34 embedded in said mounting portion. There is also shown a coating of powdered fuel 11 on the face of the mounting portion. This type of fixture is particularly useful when it is desired to mount shelves or racks on concrete, cement or other masonry-type walls and surfaces where it is extremely difficult to drive nails or bolts into the masonry material. The mounting portion and the nail may be of any size, depending on the weight which the fixture must support. After the fixtures have been bonded to a wall, or other surface, boards or panels may be mounted thereon by forcing the boards or panels onto the protruding nail. Alternatively, a rigid stud or bolt may be embedded in the fixture and holes provided in the boards or panels which are adapted to receive the stud or bolt. The nail, stud, or bolt may be embedded in the fixture while the thermoplastic material is soft (e.g., immediately after the mounting portion has been molded or formed) or a hole may be drilled in the rigid thermoplastic material which is adapted to closely receive the nail, stud, or bolt, at any time before the fixture is mounted to a wall or surface.

Thermoplastic resins suitable in the practice of this invention are those having a melting point well above the temperatures to which the fixture will be subjected to in use. Generally, a thermoplastic resin having a melting point of at least 150° F. is suitable. In order to insure strong adhesive bonding to the structural member, the resin should not rapidly char or burn below about 300° F., thus permitting a heat source which will enable melting to occur in a relatively short period of time, e.g., 10–20 seconds. To serve as a supporting structure, the resin must have a high yield strength, e.g., at least 1,000 p.s.i. While not critical, it is further desired that the resin be capable of being molded, especially according to conventional injection molding techniques. A variety of thermoplastic resins have been found to meet these requirements, including polyesters, polyamides, ethylene copolymers such as ethylene-vinyl acetate, ethylene-acrylic acid, ethylene-vinyl alcohol, phenoxy resins, polycarbonates, chlorinated polyethylene and polypropylene. Preferred resins are ethylene-vinyl alcohol copolymers.

While the shaping of the fixture may be achieved by a variety of techniques, it is preferred that the fixture be produced by conventional injection molding techniques to provide a unitary fixture construction.

In order to bond the fixture to the structural member, the mounting portion of the fixture is melted. This can be accomplished by the direct application of the flame of a propane torch or other similar device. Coating the mounting portion of the fixture with a fuel which will ignite by means of a spark or match and burn at a temperature and for a time sufficient to melt the necessary amount of the mounting portion represents a further technique for achieving melting and subsequent bonding. The fuel may be applied at the time the fixture is to be mounted or it may be preapplied in such a manner that it will adhere during normal handling operations. Such adherence may be accomplished by applying the fuel to the mounting portion of the fixture while the latter is in a sticky state, such as at the time of formation in the mold, or it may be achieved by an adhesive which is applied to the mounting portion followed by application of the fuel. The fuel itself should have a relatively high ignition point for safety purposes and should burn at a temperature and for a time sufficient to effect the requisite melting of the mounting portion. The fuel should have a low ash content, as the ash will interfere with the bonding of the mounting portion to the structural member. A fuel having a low smoke content is also highly desirable. Exemplary of the fuels fulfilling these requirements are hexamethylene tetramine, trioxane, and cellulose nitrate, although the latter's fast burning rate makes it nonpreferred for general use. The igniting and burning characteristics of these fuels can be modified by employing mixtures of the fuels or the use of additives such as nitrates, chlorates and perchlorates. A preferred fuel is a mixture of hexamethylene tetramine and 1 percent by weight of the hexamethylene tetramine of ammonium nitrate.

The following examples are provided to further illustrate the invention. All parts and percentages are by weight unless otherwise expressed.

EXAMPLE 1

A hanger of the shape illustrated in FIG. 1 is prepared by injecting into a correspondingly shaped mold an ethylene-vinyl alcohol copolymer available under the trade name Elvon 30E by means of a screw injection molder. The article is removed by conventional techniques from the mold. Affixing of the article to a concrete wall is accomplished by heating the bonding surface of the article with a propane torch until the surface becomes soft without running or dripping (5–10 seconds heating time). The softened bonding surface is then pressed against the concrete wall within 3 to 5 seconds after heating or while it is in the softened state. The article is held in place against the wall for a time sufficient to permit it to support its own weight (3 to 5 seconds). After about 30 seconds, the article will support 50 to 60 p.s.i.

EXAMPLE 2

A block generally in the shape of the article depicted in FIG. 2 is prepared according to conventional injection molding techniques using nylon 6,6 polymer. The bonding surface is softened according to example 1 and affixed to a concrete wall also according to example 1. Upon cooling, the block bonded to the concrete wall is drilled near the center of the block to provide a starting hole for a sheetmetal screw. A circuit breaker or fuse box can be affixed to the block by means of sheetmetal screws or the like.

The articles of FIGS. 3, 4 and 5 may also in conveniently prepared according to conventional injection molding techniques using the polymers of examples 1 and 2.

EXAMPLES 3 and 4

Upon formation of articles corresponding to the articles of examples 1 and 2, the bonding surface of each is softened and then covered with a powder containing 99 percent by weight of hexamethylene tetramine and 1 percent by weight ammonium nitrate. The temperature of the softened bonding surface of the article is below the ignition temperature of the solid fuel powder. However, the softened condition permits the powder to be permanently affixed to the bonding surface. Upon igniting the fuel, such as with the flame of a match, sufficient heat is generated to soften the bonding surface sufficient to permit attachment to various substrates such as wood, plastics, concrete, or other masonry-type surfaces.

The foregoing examples indicate a few of the articles in accordance with the present invention. Others include tool holders, conduit or pipe hangers, and many other types of molded articles, for example, horseshoes. The articles of examples 1–4 are of a unitary homogenous construction. Such articles could also be constructed of one or more pieces composed of one or more materials wherein the mounting surface alone is a thermoplastic resin capable of bonding as herein described.

I claim:

1. An article having at least one mounting portion adapted for attachment to a structural surface and at least one working portion, at least said mounting portion comprising a thermoplastic resin capable of strong bonding to friable structural materials, said resin having a melting point of at least about 150° F. and a yield strength of at least about 1,000 p.s.i. at 20° C., at least a portion of said mounting portion bearing an adhered coating of a fuel adapted to ignite and burn at a temperature and for a time sufficient to melt said thermoplastic of said mounting portion on which is borne said fuel.

2. The article of claim 1 wherein said fuel is a solid, particulate fuel.

3. A process for attaching an article to a surface, said article having a mounting portion of a thermoplastic resin having a melting point of at least about 150° F. and a yield strength of at least about 1,000 p.s.i. at 20° C., said mounting portion bearing a coating of a fuel capable of igniting and burning for a time and at a temperature sufficient to soften said thermoplastic resin of said mounting portion, said process comprising igniting said fuel whereby said fuel burns for a time and at a temperature sufficient to soften said thermoplastic resin of said mounting portion, and attaching said article by said softened thermoplastic resin of said mounting portion to said surface.

* * * * *